US012574532B2

(12) United States Patent
Chuang et al.

(10) Patent No.: US 12,574,532 B2
(45) Date of Patent: Mar. 10, 2026

(54) UNIFIED CROSS-COMPONENT MODEL DERIVATION

(71) Applicant: MEDIATEK INC., Hsinchu (TW)

(72) Inventors: Cheng-Yen Chuang, Hsinchu (TW); Chia-Ming Tsai, Hsinchu (TW); Ching-Yeh Chen, Hsinchu (TW); Tzu-Der Chuang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 18/879,415

(22) PCT Filed: Jun. 30, 2023

(86) PCT No.: PCT/CN2023/104376
§ 371 (c)(1),
(2) Date: Dec. 27, 2024

(87) PCT Pub. No.: WO2024/012243
PCT Pub. Date: Jan. 18, 2024

(65) Prior Publication Data
US 2025/0392737 A1     Dec. 25, 2025

Related U.S. Application Data

(60) Provisional application No. 63/368,512, filed on Jul. 15, 2022.

(51) Int. Cl.
*H04N 19/196*          (2014.01)
*H04N 19/117*          (2014.01)
(Continued)

(52) U.S. Cl.
CPC ......... *H04N 19/196* (2014.11); *H04N 19/117* (2014.11); *H04N 19/132* (2014.11);
(Continued)

(58) Field of Classification Search
CPC .... H04N 19/176; H04N 19/593; H04N 19/11; H04N 19/159; H04N 19/105;
(Continued)

(56) References Cited

U.S. PATENT DOCUMENTS

2020/0382772 A1* 12/2020 Hsu ...................... H04N 19/176

FOREIGN PATENT DOCUMENTS

CN          108184129 A       6/2018
CN          108184129 B   *   1/2020   ............. H04N 19/96
(Continued)

OTHER PUBLICATIONS

International Search Report and Written Opinion dated Sep. 12, 2023, issued in application No. PCT/CN2023/104376.
(Continued)

*Primary Examiner* — Masum Billah
(74) *Attorney, Agent, or Firm* — McClure, Qualey & Rodack, LLP

(57)          ABSTRACT

The video coder receives a selection of a coding tool among a plurality of coding tools. The video coder specifies a set of regression data based on the selection of the coding tool. The specified set of regression data is selected from component samples within or neighboring a reference block or a current block. The video coder specifies a configuration of a convolution model according to the selection of the coding tool. The convolution model is configurable to support each of the plurality of coding tools. The video coder derives parameters of the convolution model by applying the set of regression data according to the specified configuration. The video coder applies the convolution model with the generated parameters to a set of reference component samples to obtain a set of predictor component samples. The video coder encodes or decodes the current block by using the predictor component samples.

14 Claims, 13 Drawing Sheets

(51) Int. Cl.

| | |
|---|---|
| *H04N 19/132* | (2014.01) |
| *H04N 19/136* | (2014.01) |
| *H04N 19/176* | (2014.01) |
| *H04N 19/182* | (2014.01) |
| *H04N 19/192* | (2014.01) |

(52) U.S. Cl.
CPC ......... *H04N 19/136* (2014.11); *H04N 19/176* (2014.11); *H04N 19/182* (2014.11); *H04N 19/192* (2014.11)

(58) Field of Classification Search
CPC .. H04N 19/132; H04N 19/136; H04N 19/137; H04N 19/172
USPC ........................................................ 375/240
See application file for complete search history.

(56) References Cited

FOREIGN PATENT DOCUMENTS

| | | | | | |
|---|---|---|---|---|---|
| CN | 112270286 A | * | 1/2021 | .......... | G06F 18/214 |
| CN | 113538507 A | | 10/2021 | | |
| WO | 2021086237 A2 | | 5/2021 | | |

OTHER PUBLICATIONS

Van Der Auwera, G., et al.; "Description of Core Experiment 3: Intra Prediction and Mode Coding;" Joint Video Experts Team (JVET) of ITU-T SG 16 WP 3 and ISO/IEC JTC 1/SC 29/WG 11; Jul. 2018; pp. 1-35.

* cited by examiner

● Down-sampled, reconstructed neighbor luma samples

○ Reconstructed neighbor chroma samples

△ Chroma-Luma data point

| $neiRec_L^{\prime(5)}$ | $neiRec_L^{\prime(1)}$ | $neiRec_L^{\prime(6)}$ |
|---|---|---|
| $neiRec_L^{\prime(2)}$ | $rec_L^{\prime(i,j)}$ | $neiRec_L^{\prime(3)}$ |
| $neiRec_L^{\prime(7)}$ | $neiRec_L^{\prime(4)}$ | $neiRec_L^{\prime(8)}$ |

*FIG. 5*

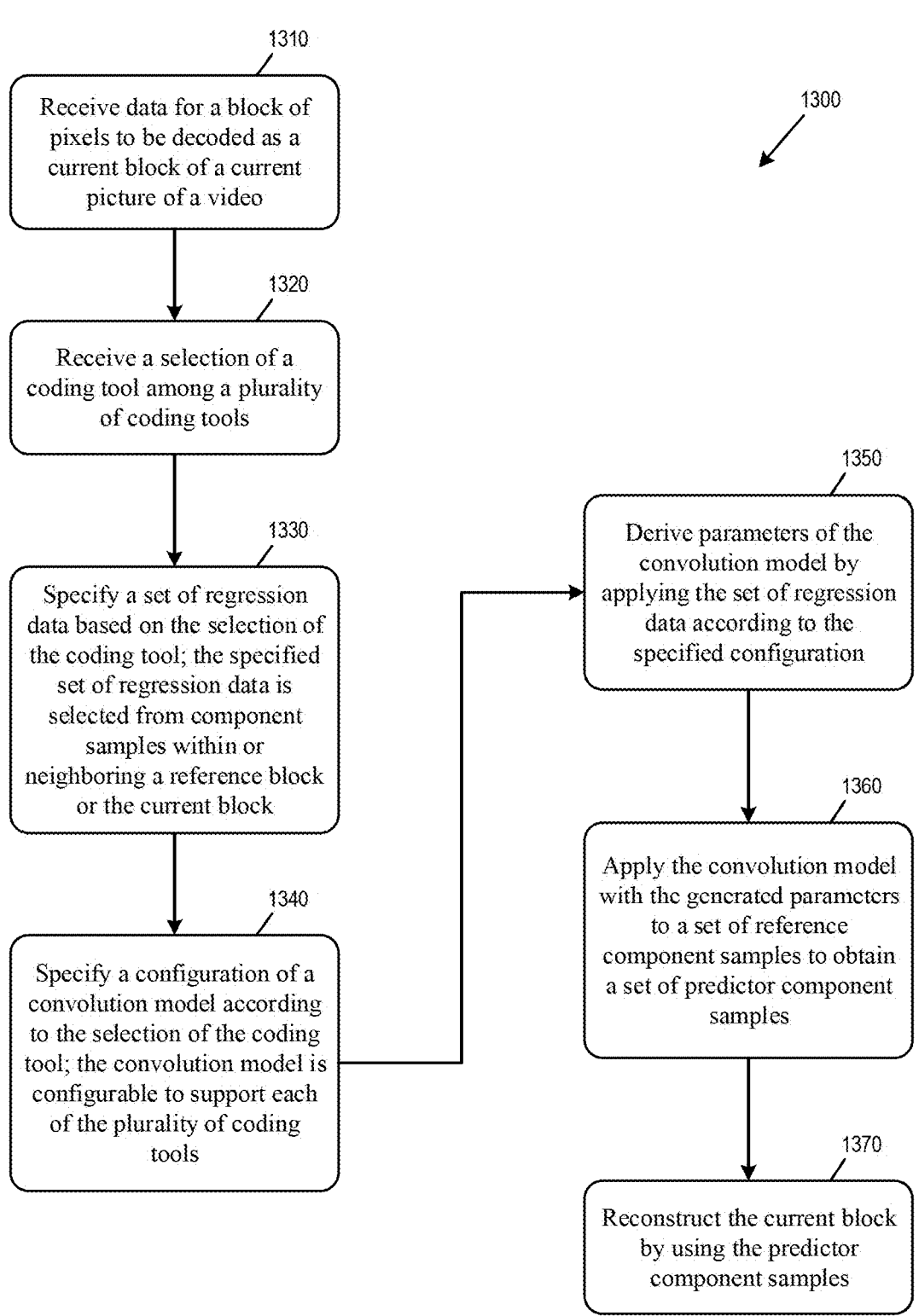

1310

Receive data for a block of pixels to be decoded as a current block of a current picture of a video

1320

Receive a selection of a coding tool among a plurality of coding tools

1330

Specify a set of regression data based on the selection of the coding tool; the specified set of regression data is selected from component samples within or neighboring a reference block or the current block

1340

Specify a configuration of a convolution model according to the selection of the coding tool; the convolution model is configurable to support each of the plurality of coding tools

1300

1350

Derive parameters of the convolution model by applying the set of regression data according to the specified configuration

1360

Apply the convolution model with the generated parameters to a set of reference component samples to obtain a set of predictor component samples

1370

Reconstruct the current block by using the predictor component samples

*FIG. 13*

UNIFIED CROSS-COMPONENT MODEL DERIVATION

CROSS REFERENCE TO RELATED PATENT APPLICATION(S)

The present disclosure is part of a non-provisional application that claims the priority benefit of U.S. Provisional Patent Application No. 63/368,512, filed on 15 Jul. 2022. Content of above-listed application is herein incorporated by reference.

TECHNICAL FIELD

The present disclosure relates generally to video coding. In particular, the present disclosure relates to methods of coding pixel blocks by cross-component model.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). The leaf nodes of a coding tree correspond to the coding units (CUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types: quad-tree partitioning, vertical binary tree partitioning, horizontal binary tree partitioning, vertical center-side triple-tree partitioning, horizontal center-side triple-tree partitioning.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one-color component associated with CTU, CU, PU, and TU, respectively. Thus, a CTU consists of one luma CTB, two chroma CTBs, and associated syntax elements. A similar relationship is valid for CU, PU, and TU.

For each inter-predicted CU, motion parameters consisting of motion vectors, reference picture indices and reference picture list usage index, and additional information are used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU. The alternative to merge mode is the explicit transmission of motion parameters, where motion vector, corresponding reference picture index for each reference picture list and reference picture list usage flag and other needed information are signalled explicitly per each CU.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method of deriving and using a unified convolution model that is configurable for different coding tools. A video coder receives a selection of a coding tool among a plurality of coding tools. The video coder specifies a set of regression data based on the selection of the coding tool. The specified set of regression data is selected from component samples within or neighboring a reference block or a current block. The video coder specifies a configuration of a convolution model according to the selection of the coding tool. The convolution model is configurable to support each of the plurality of coding tools. The video coder derives parameters of the convolution model by applying the set of regression data according to the specified configuration. The video coder applies the convolution model with the generated parameters to a set of reference component samples to obtain a set of predictor component samples. The video coder encodes or decodes the current block by using the predictor component samples.

In some embodiments, the convolution model is a higher-degree model comprising a filter with more than two filter taps. The parameters of the convolution model are obtained by using a unified solver that is used to solve a matrix equation for the plurality of coding tools. The matrix equation may be represented by Ax=b, A is an auto-correlation matrix, b is a cross-correlation vector, and x is the parameters to be solved. The unified solver may use an elimination-based method, or a decomposition-based method, or an iteration-based method, to determine an optimal vector of the convolution model as a solution for the parameters of the convolution model.

In some embodiments, the set of regression data is selected from a unified range of a plurality of reference lines neighboring the current block, the unified range being common to the plurality of coding tools. In some embodiments, the regression data of different coding tools are selected from a same number of reference lines in the unified range. In some embodiments, the unified range of the plurality of reference lines is stored in a line buffer used by the plurality of coding tools. The set of regression data may be selected from reference samples that are classified into a plurality of groups of reference samples. The regression data of different coding tools are selected from different groups of reference samples.

In some embodiments, when the set of regression data includes invalid samples, the video coder performs a unified action that is common to the plurality of coding tools. An invalid sample is a sample that fall outside of a restricted boundary or is forbidden by at least one of the plurality of coding tools.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 5 shows a reconstructed luma sample and its neighboring samples.

FIG. 13 conceptually illustrates a process for deriving and using a unified convolution model that is configurable for different coding tools.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Cross Component Linear Model (CCLM)

Cross Component Linear Model (CCLM) or Linear Model (LM) mode is a cross component prediction mode in which chroma components of a block is predicted from the collocated reconstructed luma samples by linear models. The parameters (e.g., scale and offset) of the linear model are derived from already reconstructed luma and chroma samples that are adjacent to the block. For example, in VVC, the CCLM mode makes use of inter-channel dependencies to predict the chroma samples from reconstructed luma samples. This prediction is carried out using a linear model in the form of:

$$P(i, j) = \alpha \cdot rec'_L(i, j) + \beta \qquad (1)$$

P(i,j) in eq. (1) represents the predicted chroma samples in a CU (or the predicted chroma samples of the current CU) and $rec'_L(i,j)$ represents the down-sampled reconstructed luma samples of the same CU (or the corresponding reconstructed luma samples of the current CU).

The CCLM model parameters $\alpha$ (scaling parameter) and $\beta$ (offset parameter) are derived based on at most four neighboring chroma samples and their corresponding down-sampled luma samples. In LM_A mode (also denoted as LM-T mode), only the above or top-neighboring template is used to calculate the linear model coefficients. In LM_L mode (also denoted as LM-L mode), only left template is used to calculate the linear model coefficients. In LM-LA mode (also denoted as LM-LT mode), both left and above templates are used to calculate the linear model coefficients.

Figure 1:
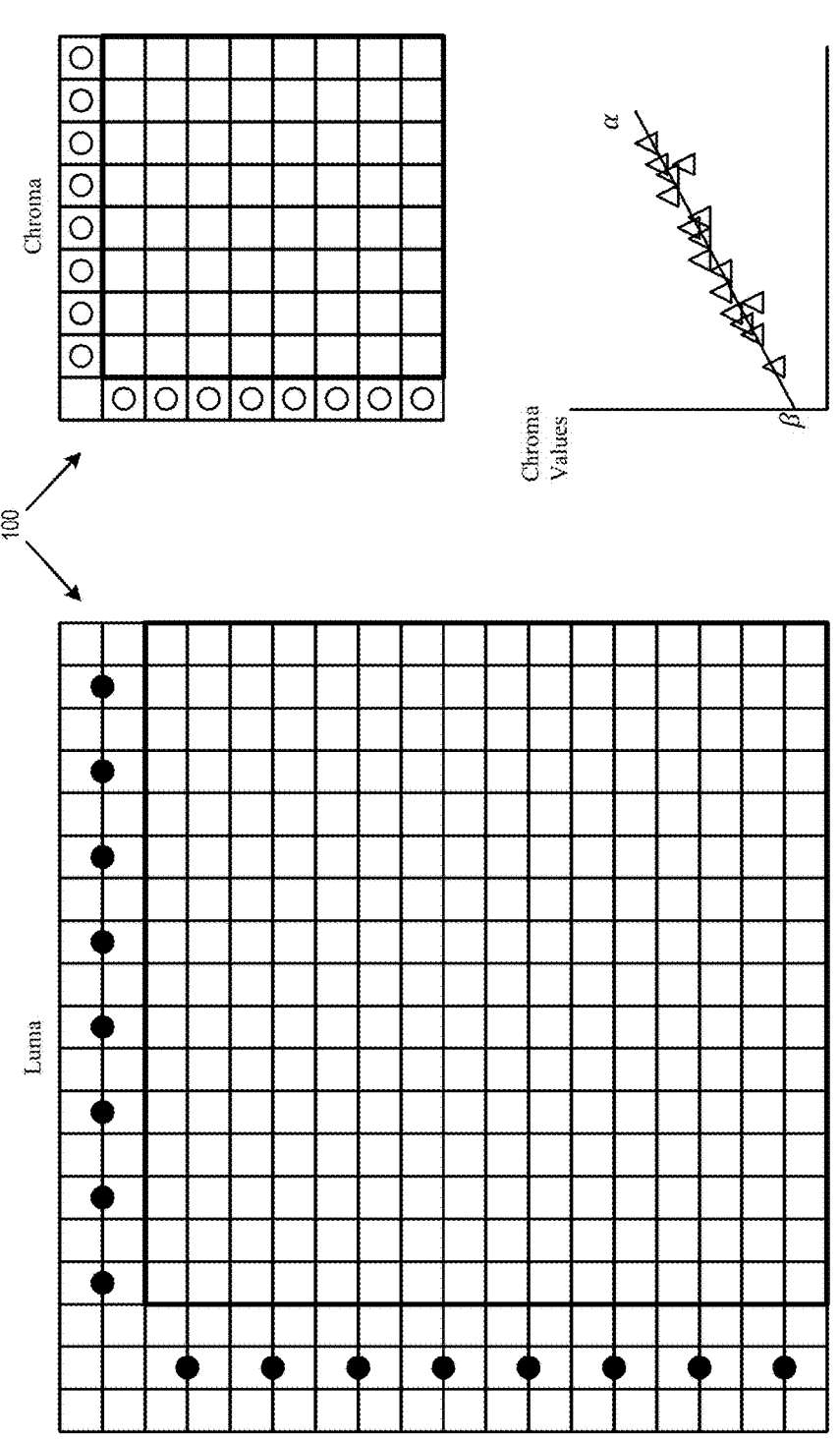
FIG. 1 conceptually illustrates chroma and luma samples that are used for derivation of linear model parameters.

FIG. 1 conceptually illustrates chroma and luma samples that are used for derivation of linear model parameters. The figure illustrates a current block 100 having luma component samples and chroma component samples in 4:2:0 format. The luma and chroma samples neighboring the current block are reconstructed samples. These reconstructed samples are used to derive the cross-component linear model (parameters $\alpha$ and $\beta$). Since the current block in in 4:2:0 format, the luma samples are down-sampled first before being used for linear model derivation. In the example, there are 16 pairs of reconstructed luma (down-sampled) and chroma samples neighboring the current block. These 16 pairs of luma versus chroma values are used to derive the linear model parameters.

Suppose the current chroma block dimensions are W×H, then W' and H' are set as

W'=W, H'=H when LM-LT mode is applied;
W'=W+H when LM-T mode is applied;
H'=H+W when LM-L mode is applied The above neighboring positions are denoted as S[0, −1] . . . S[W'−1, −1] and the left neighboring positions are denoted as S[−1, 0] . . . S[−1, H'−1]. Then the four samples are selected as S[W'/4, −1], S[3*W'/4, −1], S[−1, H'/4], S[−1, 3*H'/4] when LM mode is applied (both above and left neighboring samples are available);
S[W'/8, −1], S[3*W'/8, −1], S[5*W'/8, −1], S[7*W'/8, −1] when LM-T mode is applied (only the above neighboring samples are available);
S[−1, H'/8], S[−1, 3*H'/8], S[−1, 5*H'/8], S[−1, 7*H'/8] when LM-L mode is applied (only the left neighboring samples are available);

The four neighboring luma samples at the selected positions are down-sampled and compared four times to find two larger values: $x^0_A$ and $x^1_A$, and two smaller values: $x^0_B$ and $x^1_B$. Their corresponding chroma sample values are denoted as $y^0_A$, $y^1_A$, $y^0_B$ and $y^1_B$. Then $X_A$, $X_B$, $Y_A$ and $Y_B$ are derived as:

$$X_a = \left(x^0_A + x^1_A + 1\right) >> 1; \; X_b = \left(x^0_B + x^1_B + 1\right) >> 1 \quad (2)$$

$$Y_a = \left(y^0_A + y^1_A + 1\right) >> 1; \; Y_b = \left(y^0_B + y^1_B + 1\right) >> 1 \quad (3)$$

The linear model parameters $\alpha$ and $\beta$ are obtained according to the following equations $$\alpha = \frac{Y_a - Y_b}{X_a - X_b} \quad (4)$$

$$\beta = Y_b - \alpha \cdot X_b \quad (5)$$

The operations to calculate the $\alpha$ and $\beta$ parameters according to eq. (4) and (5) may be implemented by a look-up table. In some embodiments, to reduce the memory required for storing the look-up table, the diff value (difference between maximum and minimum values) and the parameter $\alpha$ are expressed by an exponential notation. For example, diff is approximated with a 4-bit significant part and an exponent. Consequently, the table for 1/diff is reduced to 16 elements for 16 values of the significand as follows:

$$DivTable \; [\;] = \{0, 7, 6, 5, 5, 4, 4, 3, 3, 2, 2, 1, 1, 1, 1, 0\} \quad (6)$$

This reduces the complexity of the calculation as well as the memory size required for storing the needed tables.

In some embodiments, to get more samples for calculating the CCLM model parameters $\alpha$ and $\beta$, the above template is extended to contain (W+H) samples for LM-T mode, the left template is extended to contain (H+W) samples for LM-L mode. For LM-LT mode, both the extended left template and the extended above templates are used to calculate the linear model coefficients.

To match the chroma sample locations for 4:2:0 video sequences, two types of down-sampling filters are applied to luma samples to achieve 2 to 1 down-sampling ratio in both horizontal and vertical directions. The selection of down-sampling filter is specified by a sequence parameter set (SPS) level flag. The two down-sampling filters are as follows, which correspond to "type-0" and "type-2" content, respectively.

$$rec_L'(i,j) = [rec_L(2i-1,2j-1) + 2*rec_L(2i,1,2j-1) + rec_L(2i+1,2j-1) + rec_L(2i-1,2j) + 2*rec_L(2i,2j) + rec_L(2i+1,2j) + 4] >> 3 \quad (7)$$

$$rec_L'(i,j) = [rec_L(2i,2j-1) + rec_L(2i-1,2j) + 4*rec_L(2i,2j) + rec_L(2i+1,2j) + rec_L(2i,2j+1) + 4] >> 3 \quad (8)$$

In some embodiments, only one luma line (general line buffer in intra prediction) is used to make the down-sampled luma samples when the upper reference line is at the CTU boundary.

In some embodiments, the $\alpha$ and $\beta$ parameters computation is performed as part of the decoding process, and is not just as an encoder search operation. As a result, no syntax is used to convey the $\alpha$ and $\beta$ values to decoder.

For chroma intra mode coding, a total of 8 intra modes are allowed. Those modes include five traditional intra modes and three cross-component linear model modes (LM_LA, LM_A, and LM_L). Chroma intra mode coding may directly depend on the intra prediction mode of the corresponding luma block. Chroma intra mode signaling and corresponding luma intra prediction modes are according to the following table:

| Chroma Intra Prediction Mode | Corresponding Luma Intra Prediction Mode | | | | |
|---|---|---|---|---|---|
| | 0 | 50 | 18 | 1 | X (0 ≤ X ≤ 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

Since separate block partitioning structure for luma and chroma components is enabled in I slices, one chroma block may correspond to multiple luma blocks. Therefore, for chroma derived mode (DM) mode, the intra prediction mode of the corresponding luma block covering the center position of the current chroma block is directly inherited.

A single unified binarization table (mapping to bin string) is used for chroma intra prediction mode according to the following table:

| Chroma intra prediction mode | Bin string |
|---|---|
| 4 | 00 |
| 0 | 0100 |

-continued

| Chroma intra prediction mode | Bin string |
|---|---|
| 1 | 0101 |
| 2 | 0110 |
| 3 | 0111 |
| 5 | 10 |
| 6 | 110 |
| 7 | 111 |

In the Table, the first bin indicates whether it is regular (0) or LM mode (1). If it is LM mode, then the next bin indicates whether it is LM_CHROMA (0) or not. If it is not LM_CHROMA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in the table are context coded with its own context model, and the rest bins are bypass coded.

In addition, in order to reduce luma-chroma latency in dual tree, when the 64×64 luma coding tree node is not split (and ISP is not used for the 64×64 CU) or partitioned with QT, the chroma CUs in 32×32/32×16 chroma coding tree node are allowed to use CCLM in the following way:

If the 32×32 chroma node is not split or partitioned with QT split, all chroma CUs in the 32×32 node can use CCLM.

If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

II. Multi-Model CCLM (MMLM)

Multiple model CCLM mode (MMLM) uses two models for predicting the chroma samples from the luma samples for the whole CU. Similar to CCLM, three multiple model CCLM modes (MMLM_LA, MMLM_A, and MMLM_L) are used to indicate if both above and left neighboring samples, only above neighboring samples, or only left neighboring samples are used in model parameters derivation.

In MMLM, neighbouring luma samples and neighbouring chroma samples of the current block are classified into two groups, each group is used as a training set to derive a linear model (i.e., a particular $\alpha$ and $\beta$ are derived for a particular group). Furthermore, the samples of the current luma block are also classified based on the same rule for the classification of neighbouring luma samples.

Figures 2, 3:
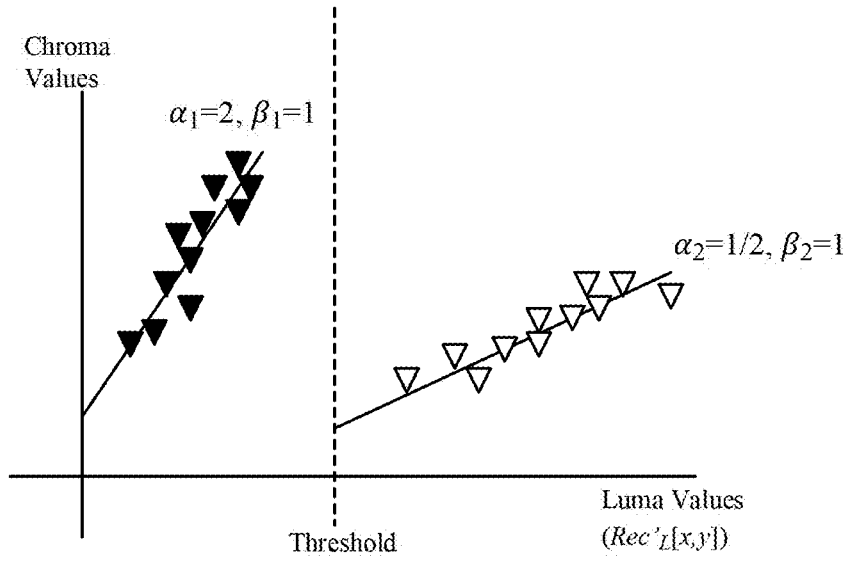
FIG. 2 shows an example of classifying the neighbouring samples into two groups.
FIG. 3 conceptually illustrates the spatial components of a convolutional filter.

FIG. 2 shows an example of classifying the neighbouring samples into two groups. Threshold is calculated as the average value of the neighbouring reconstructed luma samples. A neighbouring sample at [x,y] with $Rec'_L[x,y]$ <=Threshold is classified into group 1; while a neighbouring sample at [x,y] with $Rec'_L[x,y]$>Threshold is classified into group 2. Thus, the multi-model CCLM prediction for the chroma samples is:

$$Pred_c[x, y] = \alpha_1 \times Rec'_L[x, y] + \beta_1 \quad \text{if } Rec'_L[x, y] \leq \text{Threshold}$$

$$Pred_c[x, y] = \alpha_2 \times Rec'_L[x, y] + \beta_2 \quad \text{if } Rec'_L[x, y] > \text{Threshold}$$

III. Convolutional Cross-Component Model

In some embodiments, a convolutional cross-component model (CCCM) is applied to improve the cross-component prediction performance. For some embodiment, the convolutional model has 7-tap filter having a 5-tap plus sign shape spatial component, a non-linear term and a bias term. The input to the spatial 5-tap component of the filter includes a center (C) luma sample which is collocated with the chroma sample to be predicted and its above/north (N), below/south (S), left/west (W) and right/east (E) neighbors. FIG. 3 conceptually illustrates the spatial components of a convolutional filter. The nonlinear term (denoted as P) is represented as power of two of the center luma sample C and scaled to the sample value range of the content:

$$P = (C * C + midVal) >> bitDepth \tag{9}$$

Thus, for 10-bit content the non-linear term P is calculated as:

$$P = (C * C + 512) >> 10 \tag{10}$$

The bias term (denoted as B) represents a scalar offset between the input and output (similarly to the offset term in CCLM) and is set to middle chroma value (512 for 10-bit content). Output of the filter is calculated as a convolution between the filter coefficients $c_i$ and the input values and clipped to the range of valid chroma samples:

$$predChromaVal = c_0 C + c_1 N + c_2 S + c_3 E + c_4 W + c_5 P + c_6 B \tag{11}$$

Figure 4:
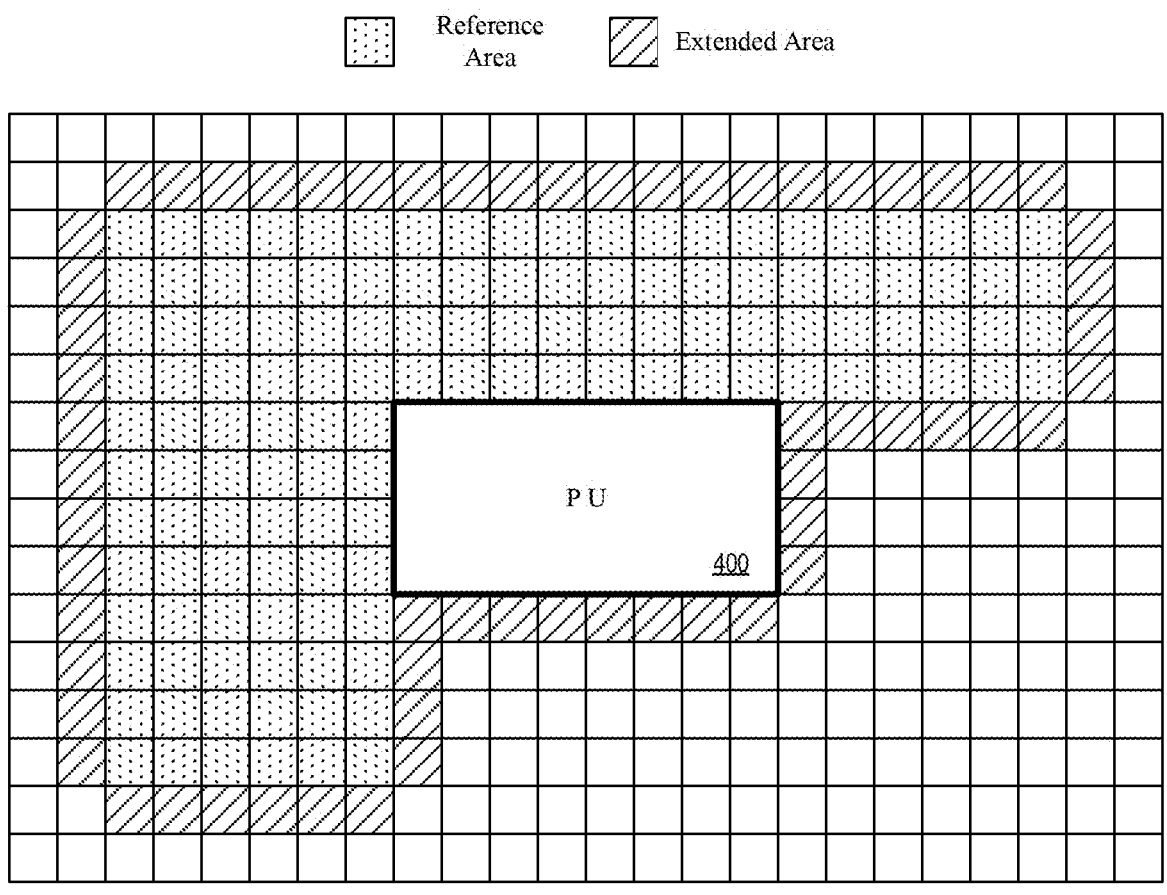
FIG. 4 illustrates a reference area that is used to derive filter coefficients for a convolution model for a current block.

The filter coefficients $c_i$ are calculated by minimising MSE between predicted and reconstructed chroma samples in a reference area. FIG. 4 illustrates a reference area that is used to derive filter coefficients for a convolution model for a current block. The reference area includes (reference) lines of (chroma) samples above and left of the current block 400. (The current block 400 is a PU in this example). The reference area extends one PU width to the right and one PU height below the PU boundaries. Area is adjusted to include only available samples. An extension area to the reference area is used to support the "side samples" of the plus shaped spatial filter and are padded when in unavailable areas.

The MSE minimization is performed by calculating an autocorrelation matrix for the luma input and a cross-correlation vector between the luma input and chroma output. The autocorrelation matrix is LDL decomposed and the final filter coefficients are calculated using back-substitution. The process is similar to the calculation of the ALF filter coefficients in ECM, however, in some embodiments, LDL decomposition was chosen instead of Cholesky decomposition to avoid using square root operations.

IV. Multiple Linear Model

For some embodiments, the relationship between two groups of data X and Y (respectively reference samples and current samples) can be represented by a linear model as below:

$$y = c_0 x + c_1 \tag{12}$$

More generally, a multiple linear model can be used to represent more complex relationship between data groups X and Y:

$$y = c_0 x_0 + c_1 x_1 + c_2 x_2 + \ldots + c_{N-1} x_{N-1} + c_N \tag{13}$$

The multiple linear model can be rewritten as:

$$y = c_0 x_0 + c_1 x_1 + c_2 x_2 + \ldots + c_{N-1} x_{N-1} + c_N = cf^T \tag{14}$$

$$c = [c_0, c_1, c_2, \ldots c_{N-1}, c_N]$$

$$f = [x_0, x_1, x_2, \ldots x_{N-1}]$$

An optimal parameter set c can be obtained by minimizing the SSD (sum of square of differences) of $(y - c\ f^T)$ for all regression data. The SSD minimization problem is equivalent to solving a matrix equation Ax=b, where A is an auto-correlation matrix of feature vector f, and b is a cross-correlation vector of feature vector f, and target y. Gaussian elimination method or Cholesky LDL decomposition method can be used to solve the matrix equation Ax=b.

V. Unified Cross Component Prediction

A. Unified Higher-Degree Model

Some embodiments of the disclosure provide methods for improving cross-component prediction accuracy or coding performance. Instead of a linear model, the video coder uses a higher-degree model to perform cross component prediction. The higher-degree model includes a k-tap spatial term, a non-linear term (denoted as P), and a bias term (denoted as B). The higher-degree model may be specified as:

$$pred_C(i, j) = \left(a_0 \times rec_L'^{(i,j)} + \sum_{x=1}^{k-1} a_x \times neiRec_L'^{(x)}\right) + b \times P + c \times B \tag{15}$$

where $$rec_L'^{(i,j)}$$

is the down-sampled reconstructed luma sample at position (i,j), and $$rec_L'^{(i,j)},$$

is one of the neighboring samples of $$neiRec_L'^{(x)}$$

and $a_0$, $a_x$, b, and c are model parameters. FIG. 5 shows a reconstructed luma sample and its neighboring samples.

In some embodiments, the higher-degree model eq. (15) is used in deriving model parameters between color components, or between the samples of the current frame and a reference frame. The model parameters may be adaptively configured according to a specific coding mode or tool. For example, the predicted chroma value of CCCM according to eq. (10) can be represented by the high degree model eq. (15) by setting the following: $rec_L'^{(i,j)}$=C; $neiRec_L'^{(1)}$=N; $neiRec_L'^{(2)}$=W; $neiRec_L'^{(3)}$=E; and $neiRec_L'^{(4)}$=S. In some embodiments, some different coding modes may share a same model and a same model parameter derivation method.

In some embodiments, for a coding mode, the equation used for generating the chroma predictor is as follows: (this can be viewed as a special case of eq. (15) by setting parameter $a_1$ to $a_{k-1}$ and b as zero)

$$pred_C(i, j) = a_0 \times rec_L'^{(i,j)} + c \times B \tag{16}$$

In some embodiments, for a coding mode, the equation used for generating the chroma predictor is as follows: (this can be a special case of eq. (15) by setting parameters $a_1$ to $a_{k-1}$ as zeroes)

$$pred_C(i, j) = a_0 \times rec_L'^{(i,j)} + b \times P + c \times B \tag{17}$$

In some embodiments, for a coding mode, the equation used for generating the chroma predictor is as follows: (this can be a special case of eq. (15) by setting parameters $a_5$ to $a_{k-1}$ and b as zeroes)

$$pred_C(i, j) = \left(a_0 \times rec_L'^{(i,j)} + \sum_{x=1}^{4} a_x \times neiRec_L'^{(x)}\right) + c \times B \tag{18}$$

In some embodiments, for a coding mode, the equation used for generating the chroma predictor is as follows: (this can be a special case of eq. (15) by setting parameter $a_5$ to $a_{k-1}$ as zeroes)

$$pred_C(i, j) = \left(a_0 \times rec_L'^{(i,j)} + \sum_{x=1}^{4} a_x \times neiRec_L'^{(x)}\right) + b \times P + c \times B \tag{19}$$

In some embodiments, for a coding mode, the equation used for generating the chroma predictor is as follows: (this can be a special case of eq. (15) by setting parameter $a_{10}$ to $a_{k-1}$ as zeroes)

$$pred_C(i, j) = \left(a_0 \times rec_L'^{(i,j)} + \sum_{x=1}^{9} a_x \times neiRec_L'^{(x)}\right) + b \times P + c \times B \tag{20}$$

In some embodiments, for a coding mode, the equation used for generating the illumination compensated predictor is as follows: (this can be a special case of eq. (15) by setting parameter $a_1$ to $a_{k-1}$ and b as zeroes)

$$pred_{LIC}(i, j) = a_0 \times rec^{(i,j)} + c \times B \qquad (21)$$

For some embodiments in which a linear model or a higher-degree model (e.g., eq. (15) or any of the special cases of eq. (15) described above) is used, the optimal parameters can be obtained by solving a matrix equation Ax=b, where A is an auto-correlation matrix, b is a cross-correlation vector and x is the optimal parameters to be solved. For some embodiments, a same method or a unified solver is used to solve the matrix equation Ax=b for different coding tools.

In some embodiments, elimination-based method (e.g., Gaussian elimination) can be used to solve the equation Ax=b and find the optimal vector x of a linear model or a higher-degree model. In some embodiments, decomposition-based method (e.g., Cholesky or LDL decomposition) can be used to solve the equation Ax=b and find the optimal vector x which is the optimal parameters of a linear model or a higher-degree model. In some embodiments, iteration-based method (e.g., Jacobi method) can be used to solve the equation Ax=b and find the optimal vector x which is the optimal parameters of linear model or higher-degree model.

For example, for CCCM, the predicted chroma value eq. (10) can be rewritten as:

$$y = c_0 C + c_1 N + c_2 S + c_3 E + c_4 W + c_5 P + c_6 B \qquad (22)$$

A is an auto-correlation matrix of feature vector f=[C, N, S, E, W, P, B], $$A = \begin{vmatrix} \sum C_i^2 & \sum C_i N_i & \sum C_i S_i & \sum C_i E_i & \sum C_i W_i & \sum C_i P_i & \sum C_i B_i \\ \sum N_i C_i & \sum N_i^2 & \sum N_i S_i & \sum N_i E_i & \sum N_i W_i & \sum N_i P_i & \sum N_i B_i \\ \sum S_i C_i & \sum S_i N_i & \sum S_i^2 & \sum S_i E_i & \sum S_i W_i & \sum S_i P_i & \sum S_i B_i \\ \sum E_i C_i & \sum E_i N_i & \sum E_i S_i & \sum E_i^2 & \sum E_i W_i & \sum E_i P_i & \sum E_i B_i \\ \sum W_i C_i & \sum W_i N_i & \sum W_i S_i & \sum W_i E_i & \sum W_i^2 & \sum W_i P_i & \sum W_i B_i \\ \sum P_i C_i & \sum P_i N_i & \sum P_i S_i & \sum P_i E_i & \sum P_i W_i & \sum P_i^2 & \sum P_i B_i \\ \sum B_i C_i & \sum B_i N_i & \sum B_i S_i & \sum B_i E_i & \sum B_i W_i & \sum B_i P_i & \sum B_i^2 \end{vmatrix}$$

b is a cross-correlation vector of feature vector f and target y, $$b = \begin{vmatrix} \sum C_i y_i \\ \sum N_i y_i \\ \sum S_i y_i \\ \sum E_i y_i \\ \sum W_i y_i \\ \sum P_i y_i \\ \sum B_i y_i \end{vmatrix}$$

B. Unified Selection of Regression Data

In some embodiments, the selection of regression data (including reference samples and current samples) in deriving model parameters may also be unified between different coding modes. The same input interface of reference samples of the higher-degree model is used or shared among multiple different coding modes.

In some embodiments, different coding tools share a same method of defining a unified range of available data for regression. For example, reference/current samples may be classified into many groups, and the video coder performing a particular coding mode may input the required reference/current samples by choosing those reference/current samples belong to a specified group as regression data to derive the corresponding model parameters.

In some embodiments, different coding tools may share a same method of handling invalid data. Some coding tools may allow only the above samples or the left samples for regression, while handling reference data of the other side as invalid reference data by setting them to NULL, 0, or a predefined inactive value. For example, assuming that the input interface requires the reference samples from above, above-right, above-left, left, and left-bottom reference samples of the current block and/or the reference block (the reference block may be a corresponding luma block of the current block or a motion-compensated reference block), if the current coding mode only uses one side reference samples, the video coder may set the reference samples of other sides to NULL, 0, or a predefined value to render as inactive those non-used reference samples in model derivation process. As another example, if the required reference data is outside the restricted boundary (slice boundary, sub-picture boundary or CTU boundary), the video coder may perform invalid reference data handling on the reference data of the outside region by setting the reference data to NULL, 0, a predefined inactive value, or repeat from neighboring available data.

In some embodiments, a coding mode may specify a high-pass filter or a low pass filter to be applied to the reference/current samples for obtaining the gradient or smoothed/down-sampled reference/current samples, and the video coder when performing the coding mode may input the requires reference/current samples and then apply the high-pass filter or the low-pass filter to the input reference/current samples.

In some embodiments, one reference line buffer is used by different coding modes sharing a same higher-degree model. The number of reference lines may be 2, 3, 4, 5, or 6 for different coding modes. In some embodiments, regression data of different coding tools are selected from a same number of reference lines in the unified range. If a required reference line falls outside the restricted boundary (e.g., slice boundary, sub-picture boundary, or CTU boundary), the content of the required reference line is repeated from one or more of the available reference lines. In some embodiments, a reference line that falls outside the restricted boundary is not used in the model parameter derivation process.

Figure 6:
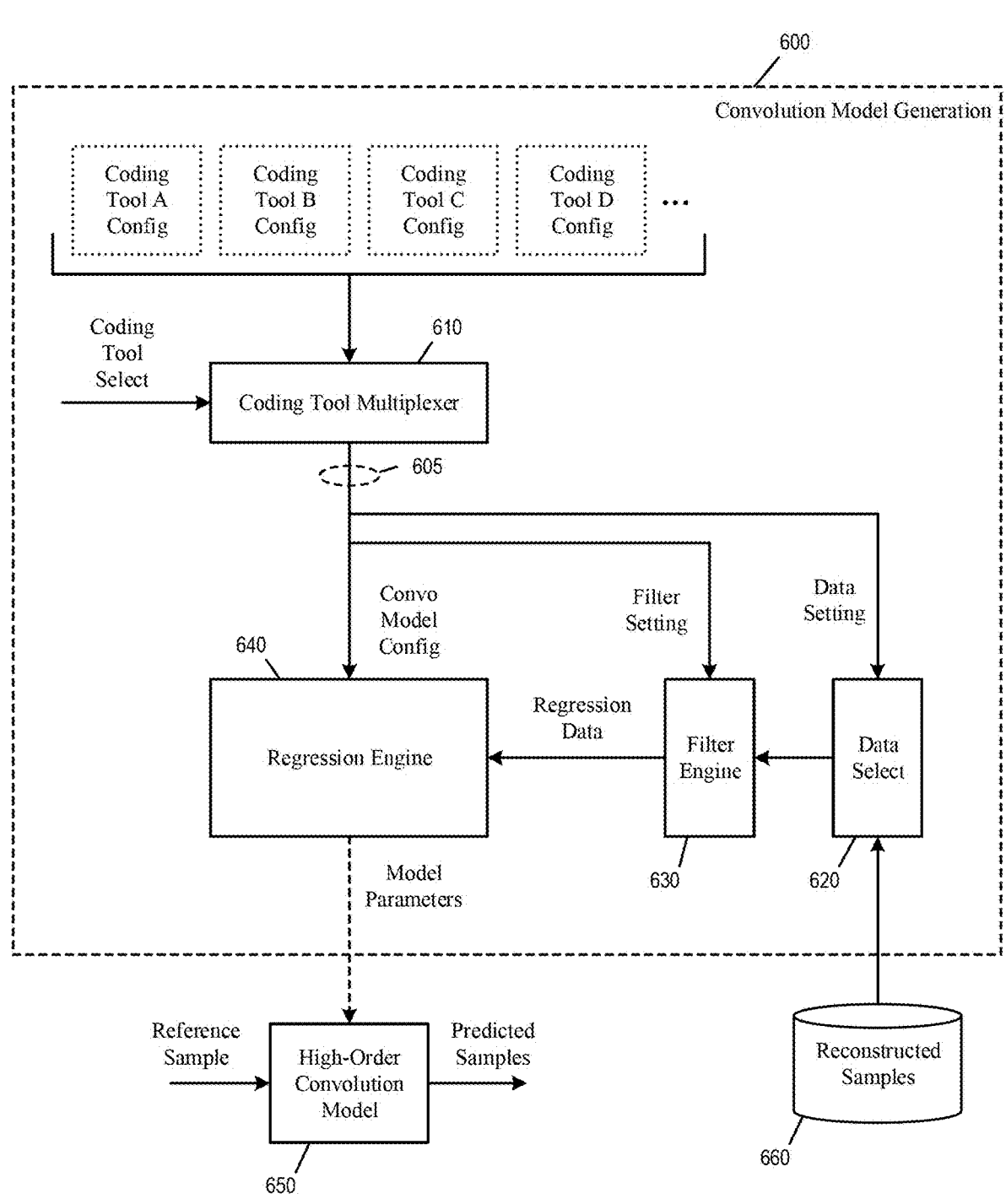
FIG. 6 conceptually illustrates a convolution model generation system 600 that is configurable for different coding tools.

FIG. 6 conceptually illustrates a convolution model generation system 600 that is configurable for different coding tools or modes. In some embodiments, the system 600 is implemented by a video coder (encoder or decoder). The convolution model generation system 600 may be configured to target one of several coding tools. Each coding tools has corresponding set of configurations for the convolution model generation system 600.

As illustrated, a coding tool multiplexer 610 based on a coding tool selection signal selects one of several set of configuration data. The selected set of configuration data 605 is used to configure a data selector 620, a filter engine 630, and a regression engine 640.

The data selector 620 retrieves reconstructed samples from a storage 660 (e.g., the reconstructed picture buffer 850 or the decoded picture buffer 1150). The filter engine 630 may apply filtering operation to the reconstructed samples. The reconstructed samples (possibly filtered) are then used by the regression engine 640 as regression data to generate a convolution model 650.

The data selector 620 can be configured to retrieve reconstructed samples required by the selected coding tool. In some embodiments, reconstructed samples related to the current block are divided into groups, and the selected set of configuration data 605 specifies which group(s) of reconstructed samples are to be retrieved. In some embodiments, the selected set of configuration data specifies which reference line(s) to use for the selected coding tool. In some embodiments, the selected set of configuration data specifies the handling of invalid reference data for the selected coding tool. For example, when a reference sample or a reference line required by the selected coding tool falls outside of a specified boundary, the data selector 620 may set the reference data to NULL, 0, a predefined inactive value, or repeat from neighboring available data.

The selected set of configuration data 605 also configures the filter engine 630 to apply a high-pass or low-pass filter on the reconstructed samples. This allows filtering to be applied on the regression data as required by the selected coding tool.

The regression engine 640 can be configured to perform data regression based on the reconstructed samples provided by the filter engine 630 and the data selector 620. The regression engine 640 may perform LDL decomposition or Cholesky decomposition to generate the model parameters of the convolution model 650. The convolution model 650 is capable of supporting eq. (15), but can be configured by the selected set of configuration data 605 to support any of eqs. (16)-(22) by setting specified terms of the higher-degree model to zeroes. With the model parameters generated, the convolution model 650 can be used to generate the predicted samples for encoding or decoding the current block.

C. Generalized Prediction for Component Samples

The method of higher-degree convolution model described in this section can be used for cross-component prediction, for example, using luma samples as reference data to predict chroma samples of a same block of pixels. In some embodiments, the higher-degree convolution model described in this section can be constructed based on any two groups of component samples as regression data (X and Y), and the constructed model can be applied to perform prediction between two other groups of component samples having an analogous relationship. For example, the higher-degree convolution model can be constructed based on component samples of a reference block and component samples of a reference template neighboring the reference block, and the constructed model can be used to perform prediction for component samples of a current block based on component samples of a current template neighboring the current block.

Figure 7A:
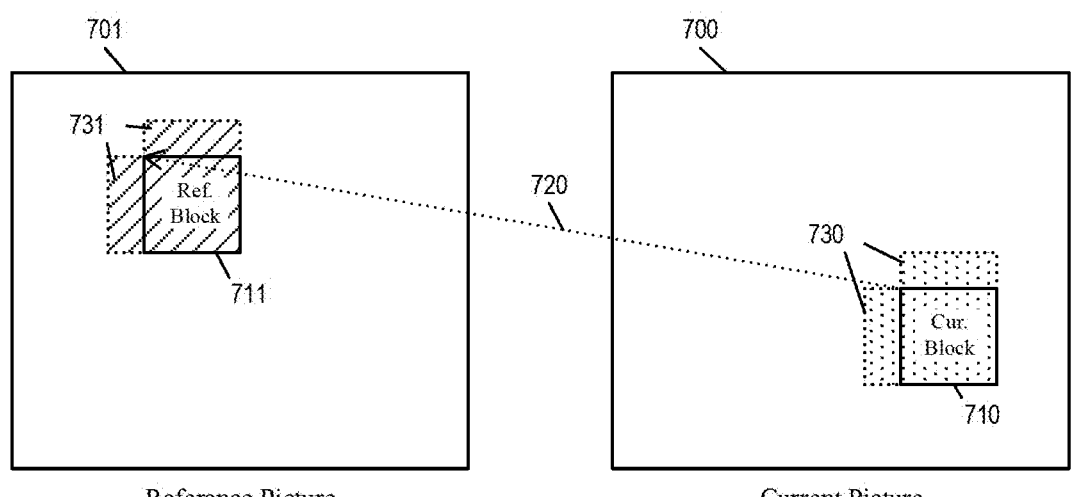
FIGS. 7A-B conceptually illustrate example sources of component samples that can be used to construct higher-degree convolution models.
Figure 7B:
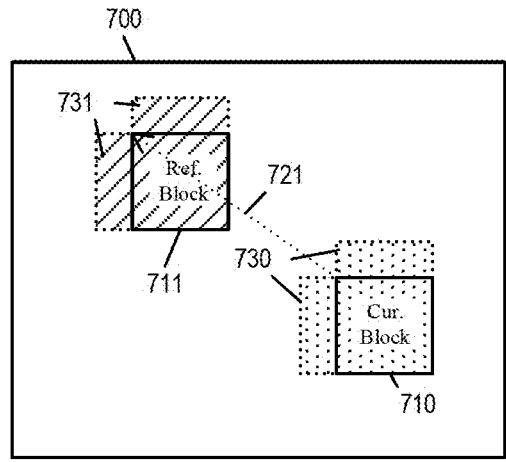

FIGS. 7A-B conceptually illustrate example sources of component samples that can be used to construct higher-degree convolution models. The figures illustrate a current block and its reference block. The current block 710 is in a current picture 700. The reference block 711 is a predictor for the current block 710 according to inter-prediction or intra-prediction.

FIG. 7A illustrates the reference block 711 being a predictor of the current block 710 under inter-prediction. As illustrated, a motion vector (MV) 720 of the current block

710 identifies the reference block 711 in a reference picture 701 as a predictor of the current block for inter-prediction.

FIG. 7B illustrates the reference block 711 being a predictor of the current block 710 under intra-prediction. As illustrated, an intra-prediction direction or mode 721 or a block vector (BV) identifies or derives the reference block 711 from samples of the current picture 700 as a predictor of the current block 710 for intra prediction.

As illustrated in FIGS. 7A-B, a current template region 730 includes reconstructed samples that neighbors the current block 710 in the current picture 700. The current template region 730 has a corresponding or collocated reference template region 731 neighboring the reference block 711 in either the current picture 700 (for intra-prediction) or the reference picture 701 (for inter-prediction). The current samples may be taken from within or around the current block 710 and the current template region 730. The reference samples may be taken from within or around a reference block 711 and the reference template region 731. In some embodiments, reference samples and current samples are used to derive a convolution model.

The convolution model may be a cross-component model. For example, in some embodiments, the convolution model may be constructed using reference and current samples of a first color component in collocated regions (e.g., between Y samples in the reference template 731 and Y samples in current template 730) and be used to predict samples of a second color component in collocated regions (e.g., from Cr or Cb of reference block 711 to refined prediction of Cr or Cb for current block 710). For another example, in some embodiments, the convolution/cross-component model may be constructed using corresponding cross-component reference and/or current samples of first and second color components of a first region (e.g., Y vs. Cr/Cb in the reference block 711 or current template 730) and be used to make cross-component prediction in a second region (e.g., from Y to Cr/Cb in the current block 710).

The convolution model may also be used in a non-cross-component manner. For example, a convolution model derived based on reference and current samples of a first color component in and around a first block (e.g., between Y samples in the reference template 731 and Y samples of the reference block 711) can be used to predict samples of the same first color component in a second block (e.g., from Y samples in the current template 730 to Y samples in the current block 710).

Any of the foregoing proposed methods can be implemented in encoders and/or decoders. For example, any of the proposed methods can be implemented in an inter/intra/prediction module of an encoder, and/or an inter/intra/prediction module of a decoder. Alternatively, any of the proposed methods can be implemented as a circuit coupled to the inter/intra/prediction module of the encoder and/or the inter/intra/prediction module of the decoder, so as to provide the information needed by the inter/intra/prediction module.

VI. Example Video Encoder

Figure 8:
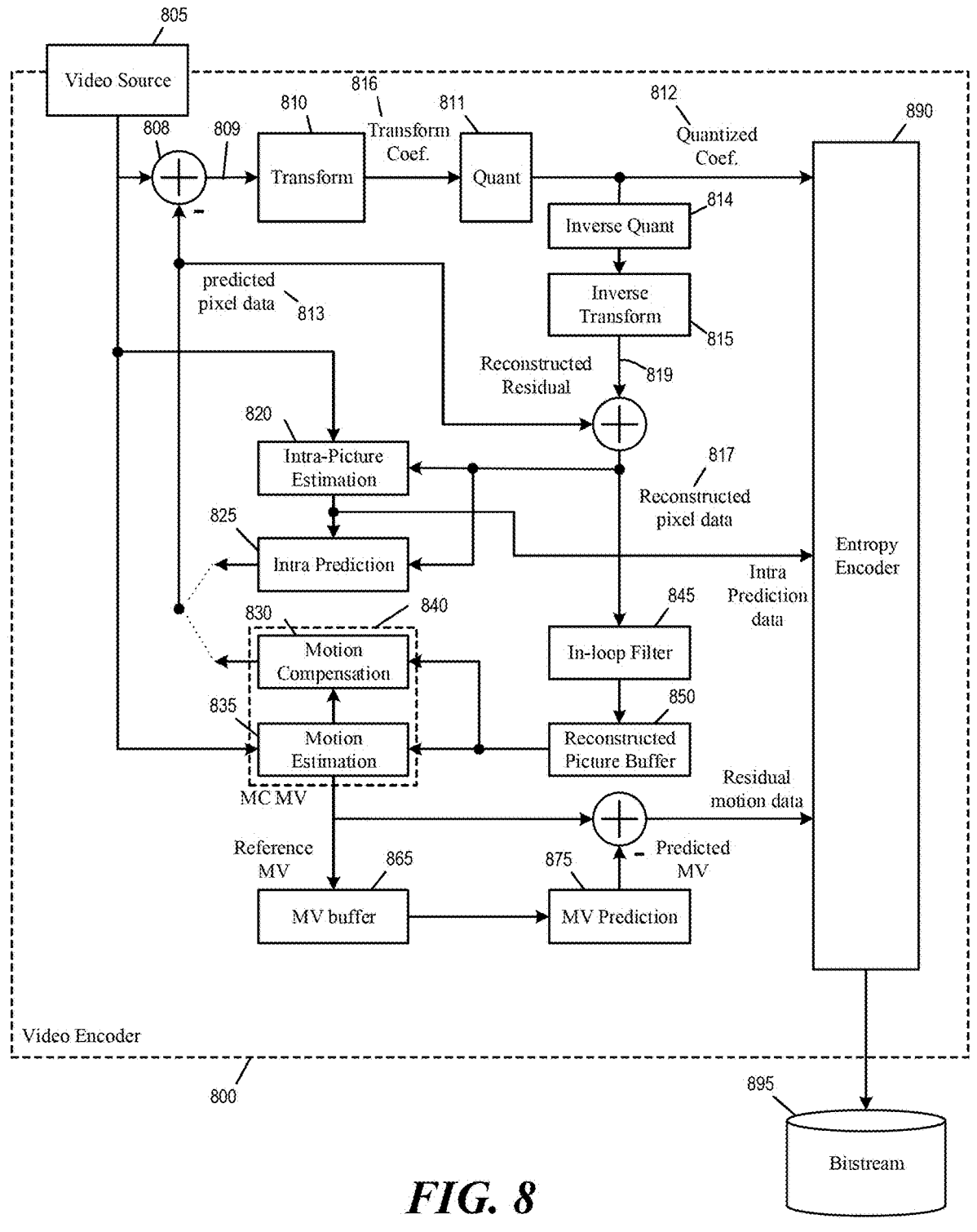
FIG. 8 illustrates an example video encoder that may implement cross-component prediction.

FIG. 8 illustrates an example video encoder 800 that may implement cross-component prediction. As illustrated, the video encoder 800 receives input video signal from a video source 805 and encodes the signal into bitstream 895. The video encoder 800 has several components or modules for encoding the signal from the video source 805, at least including some components selected from a transform module 810, a quantization module 811, an inverse quantization module 814, an inverse transform module 815, an intra-picture estimation module 820, an intra-prediction module 825, a motion compensation module 830, a motion estimation module 835, an in-loop filter 845, a reconstructed picture buffer 850, a MV buffer 865, and a MV prediction module 875, and an entropy encoder 890. The motion compensation module 830 and the motion estimation module 835 are part of an inter-prediction module 840.

In some embodiments, the modules 810-890 are modules of software instructions being executed by one or more processing units (e.g., a processor) of a computing device or electronic apparatus. In some embodiments, the modules 810-890 are modules of hardware circuits implemented by one or more integrated circuits (ICs) of an electronic apparatus. Though the modules 810-890 are illustrated as being separate modules, some of the modules can be combined into a single module.

The video source 805 provides a raw video signal that presents pixel data of each video frame without compression. A subtractor 808 computes the difference between the raw video pixel data of the video source 805 and the predicted pixel data 813 from the motion compensation module 830 or intra-prediction module 825 as prediction residual 809. The transform module 810 converts the difference (or the residual pixel data or residual signal 808) into transform coefficients (e.g., by performing Discrete Cosine Transform, or DCT). The quantization module 811 quantizes the transform coefficients into quantized data (or quantized coefficients) 812, which is encoded into the bitstream 895 by the entropy encoder 890.

The inverse quantization module 814 de-quantizes the quantized data (or quantized coefficients) 812 to obtain transform coefficients, and the inverse transform module 815 performs inverse transform on the transform coefficients to produce reconstructed residual 819. The reconstructed residual 819 is added with the predicted pixel data 813 to produce reconstructed pixel data 817. In some embodiments, the reconstructed pixel data 817 is temporarily stored in a line buffer (not illustrated) for intra-picture prediction and spatial MV prediction. The reconstructed pixels are filtered by the in-loop filter 845 and stored in the reconstructed picture buffer 850. In some embodiments, the reconstructed picture buffer 850 is a storage external to the video encoder 800. In some embodiments, the reconstructed picture buffer 850 is a storage internal to the video encoder 800.

The intra-picture estimation module 820 performs intra-prediction based on the reconstructed pixel data 817 to produce intra prediction data. The intra-prediction data is provided to the entropy encoder 890 to be encoded into bitstream 895. The intra-prediction data is also used by the intra-prediction module 825 to produce the predicted pixel data 813.

The motion estimation module 835 performs inter-prediction by producing MVs to reference pixel data of previously decoded frames stored in the reconstructed picture buffer 850. These MVs are provided to the motion compensation module 830 to produce predicted pixel data.

Instead of encoding the complete actual MVs in the bitstream, the video encoder 800 uses MV prediction to generate predicted MVs, and the difference between the MVs used for motion compensation and the predicted MVs is encoded as residual motion data and stored in the bitstream 895.

The MV prediction module 875 generates the predicted MVs based on reference MVs that were generated for encoding previously video frames, i.e., the motion compensation MVs that were used to perform motion compensation. The MV prediction module 875 retrieves reference MVs from previous video frames from the MV buffer 865. The video encoder 800 stores the MVs generated for the current video frame in the MV buffer 865 as reference MVs for generating predicted MVs.

The MV prediction module 875 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 895 by the entropy encoder 890.

The entropy encoder 890 encodes various parameters and data into the bitstream 895 by using entropy-coding techniques such as context-adaptive binary arithmetic coding (CABAC) or Huffman encoding. The entropy encoder 890 encodes various header elements, flags, along with the quantized transform coefficients 812, and the residual motion data as syntax elements into the bitstream 895. The bitstream 895 is in turn stored in a storage device or transmitted to a decoder over a communications medium such as a network.

The in-loop filter 845 performs filtering or smoothing operations on the reconstructed pixel data 817 to reduce the artifacts of coding, particularly at boundaries of pixel blocks. In some embodiments, the filtering or smoothing operations performed by the in-loop filter 845 include deblock filter (DBF), sample adaptive offset (SAO), and/or adaptive loop filter (ALF).

Figure 9:
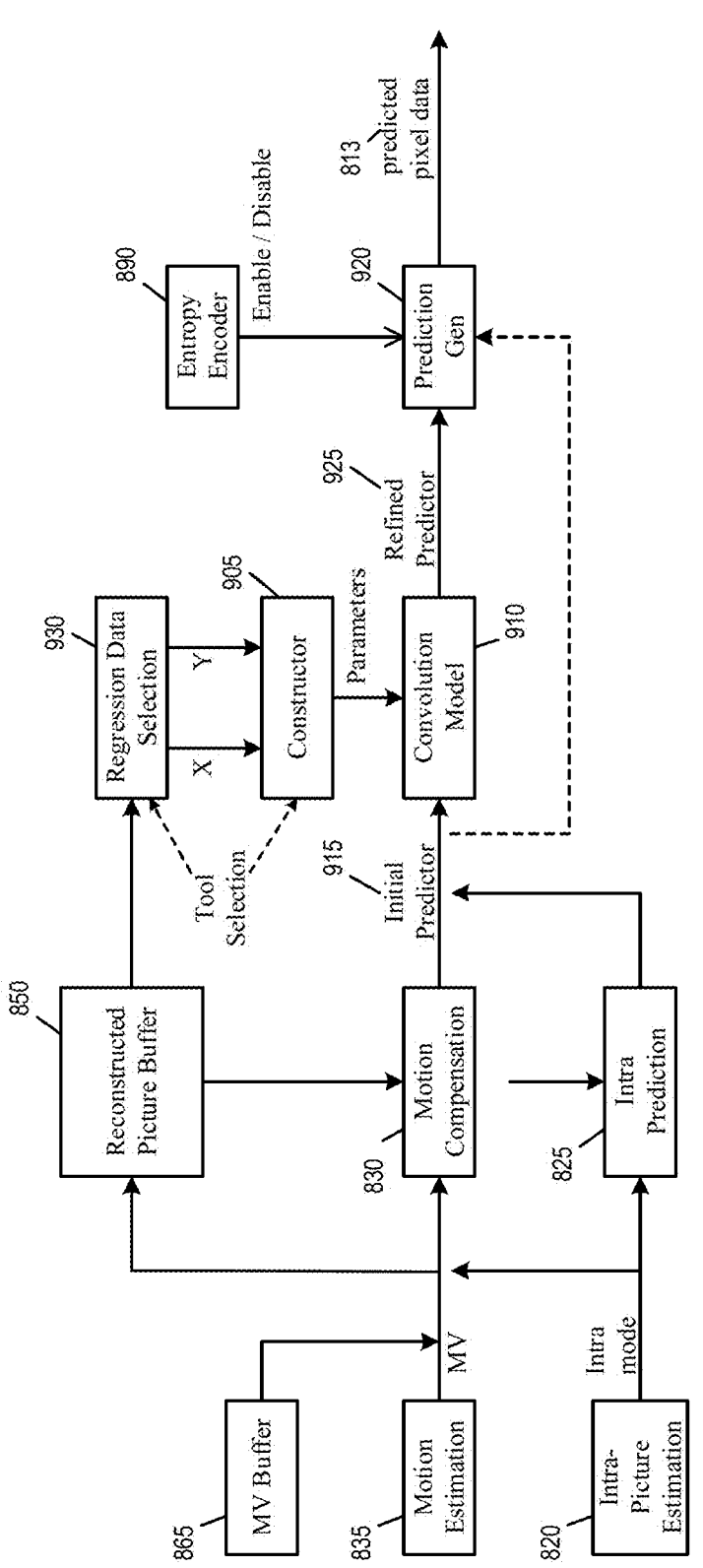
FIG. 9 illustrates portions of the video encoder that implement a unified cross-component convolution model.

FIG. 9 illustrates portions of the video encoder 800 that implement a unified cross-component convolution model. When the current block is coded by inter-prediction, the motion estimation module 835 provides a MV that is used by the motion compensation module 830 to identify a reference block in a reference picture. When the current block is coded by intra-prediction, the intra-prediction estimation module 820 provide an intra mode or BV that is used by the intra-prediction module 825 to identify a reference block in the current picture. In some embodiments, the reference block is used as an initial predictor of the current block. The initial predictor may include component samples (luma or chroma) of the reference block for predicting the component samples of the current block, or component samples of the current block for cross-component prediction.

To derive a convolution model 910, a regression data selection module 930 retrieves component samples of pixels in and/or around the current block and in and/or around the reference block from the reconstructed picture buffer 850 to serve as regression data, which may include reference samples (X) and current samples (Y). The regression data selection module 930 selects among different sets of samples (e.g., different reference lines or different groups of samples) as reference/current samples based on which coding tool is selected for the current block.

A model constructor 905 uses the regression data to derive the parameters of the convolution model 910 using techniques such as elimination method, iteration method, or decomposition method. The convolution model 910 is a higher-degree model having multiple filter taps that can be configured to support different coding tools by e.g., setting certain terms or filter taps to zero based on which coding tool is selected for the current block. The derivation of the convolution model 905 for different coding tools is described by reference to FIG. 6 above.

The convolution model 910 is applied to the initial predictor 915 to generate a refined predictor 925. The samples of the refined predictor 925 may be used as the predicted pixel data 813. In some embodiments, the refinement of intra- or inter-prediction by the convolution model 910 can be expressly or implicitly enabled or disabled (so that the samples of the initial predictor are used as the predicted pixel data 813), and the entropy encoder 890 may signal a syntax element to indicate so. In some embodiments, a prediction generator 920 may combine (e.g., as a weighted sum) the initial predictor 915 and the refined predictor 925 as the predicted pixel data 813.

Figure 10:
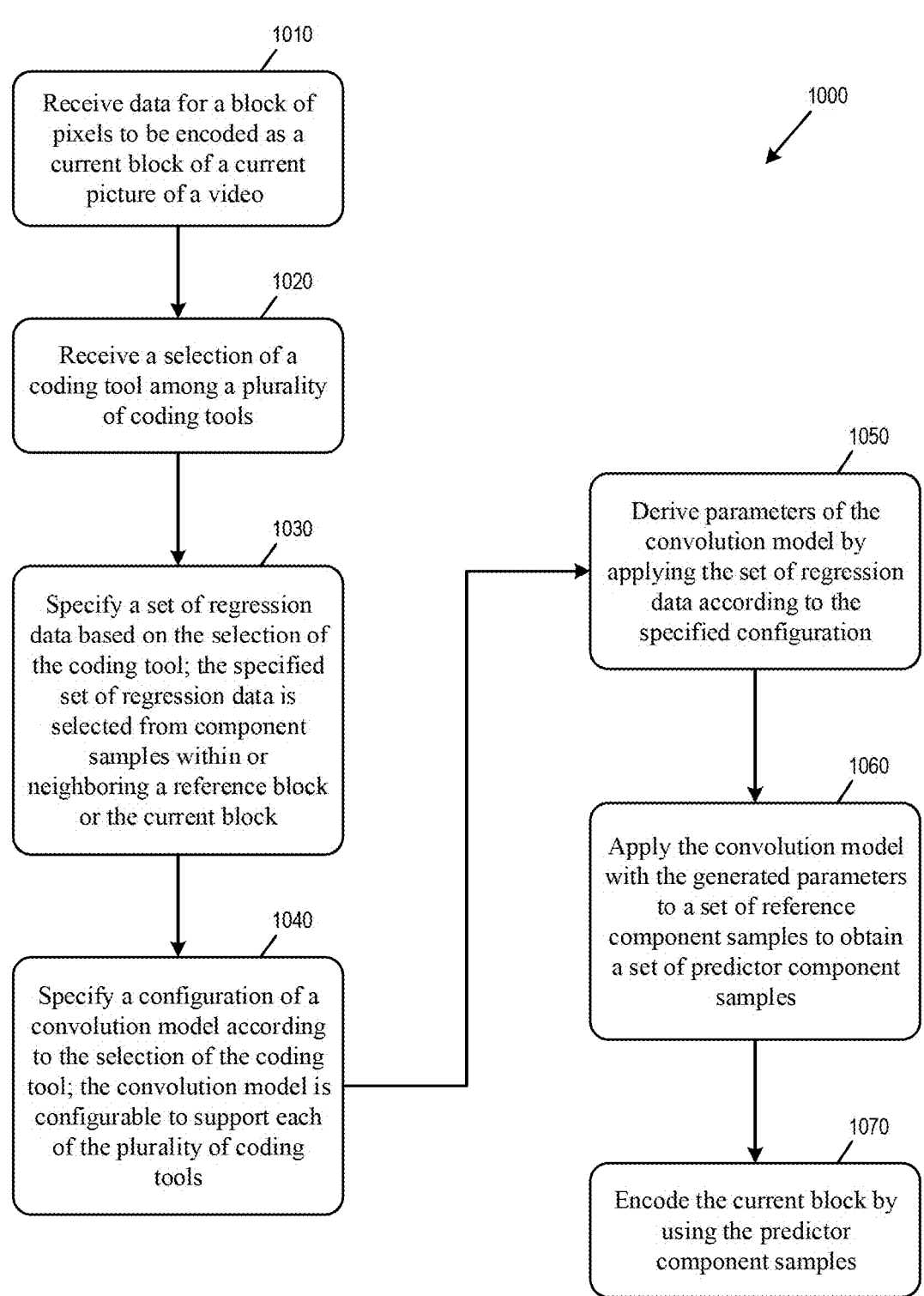
FIG. 10 conceptually illustrates a process for deriving and using a unified convolution model that is configurable for different coding tools.

FIG. 10 conceptually illustrates a process 1000 for deriving and using a unified convolution model that is configurable for different coding tools. In some embodiments, one or more processing units (e.g., a processor) of a computing device implementing the encoder 800 performs the process 1000 by executing instructions stored in a computer readable medium. In some embodiments, an electronic apparatus implementing the encoder 800 performs the process 1000.

The encoder receives (at block 1010) data to be encoded as a current block of pixels in a current picture of a video. The encoder receives (at block 1020) a selection of a coding tool among a plurality of coding tools.

The encoder specifies (at block 1030) a set of regression data based on the selection of the coding tool. The specified set of regression data is selected from component samples within or neighboring a reference block or the current block. In some embodiments, the set of regression data is selected from a plurality of reference lines neighboring the current block, and the regression data of different coding tools are selected from different reference lines. In some embodiments, the set of regression data is selected from reference samples that are classified into multiple groups of reference samples, and the regression data of different coding tools are selected from different groups of reference samples. In some embodiments, when the set of regression data includes invalid samples that fall outside of a restricted boundary (e.g., slice boundary, sub-picture boundary, or CTU boundary), the encoder performs an action based on the selection of the coding tool (e.g., setting the invalid samples to NULL, 0, or a predefined inactive value.)

The encoder specifies (at block 1040) a configuration of a convolution model according to the selection of the coding tool. The convolution model is configurable to support each of the plurality of coding tools. In some embodiments, the convolution model is a higher-degree model having a filter with more than two filter taps. In some embodiments, the convolution model comprises a plurality of terms, and the encoder configures the convolution model by setting one or more of the terms to zero. The convolution model may have multiple taps that correspond to component samples that surround a center component sample. The center sample may be a luma sample that is collocated with a chroma sample to be predicted. The convolution model may include a (plus sign shape) multi-tap spatial component, a non-linear term, and a bias term, and inputs to the spatial 5-tap component includes a center (C) component sample and its north (N), south (S), west (W) and east (E) neighboring component samples.

The encoder derives (at block 1050) parameters of the convolution model by applying the set of regression data according to the specified configuration. In some embodiments, the parameters of the convolution model are derived by finding an optimal vector of a higher-degree model by using e.g., an elimination-based method, a decomposition-based method, or an iteration-based method.

The encoder applies (at block 1060) the convolution model with the generated parameters to a set of reference component samples to obtain a set of predictor component samples. The encoder encodes (at block 1070) the current block by using the predictor component samples to produce prediction residuals and to reconstruct the current block.

VII. Example Video Decoder

In some embodiments, an encoder may signal (or generate) one or more syntax element in a bitstream, such that a decoder may parse said one or more syntax element from the bitstream.

Figure 11:
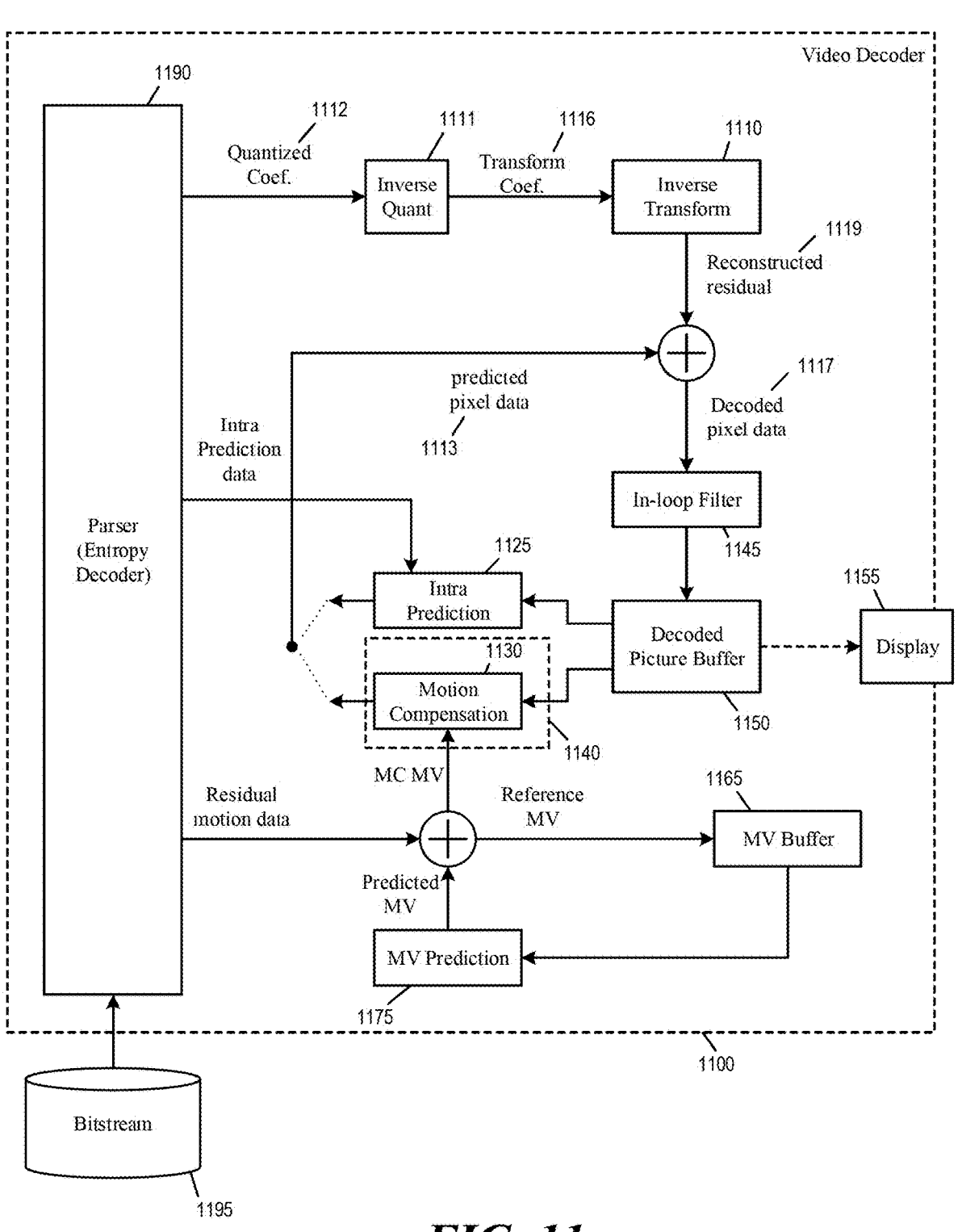
FIG. 11 illustrates an example video decoder that may implement cross-component prediction.

FIG. 11 illustrates an example video decoder 1100 that may implement cross-component prediction. As illustrated, the video decoder 1100 is an image-decoding or video-decoding circuit that receives a bitstream 1195 and decodes the content of the bitstream into pixel data of video frames for display. The video decoder 1100 has several components or modules for decoding the bitstream 1195, including some components selected from an inverse quantization module 1111, an inverse transform module 1110, an intra-prediction module 1125, a motion compensation module 1130, an in-loop filter 1145, a decoded picture buffer 1150, a MV buffer 1165, a MV prediction module 1175, and a parser 1190. The motion compensation module 1130 is part of an inter-prediction module 1140.

In some embodiments, the modules 1110-1190 are modules of software instructions being executed by one or more processing units (e.g., a processor) of a computing device. In some embodiments, the modules 1110-1190 are modules of hardware circuits implemented by one or more ICs of an electronic apparatus. Though the modules 1110-1190 are illustrated as being separate modules, some of the modules can be combined into a single module.

The parser 1190 (or entropy decoder) receives the bitstream 1195 and performs initial parsing according to the syntax defined by a video-coding or image-coding standard. The parsed syntax element includes various header elements, flags, as well as quantized data (or quantized coefficients) 1112. The parser 1190 parses out the various syntax elements by using entropy-coding techniques such as context-adaptive binary arithmetic coding (CABAC) or Huffman encoding.

The inverse quantization module 1111 de-quantizes the quantized data (or quantized coefficients) 1112 to obtain transform coefficients, and the inverse transform module 1110 performs inverse transform on the transform coefficients 1116 to produce reconstructed residual signal 1119. The reconstructed residual signal 1119 is added with predicted pixel data 1113 from the intra-prediction module 1125 or the motion compensation module 1130 to produce decoded pixel data 1117. The decoded pixels data are filtered by the in-loop filter 1145 and stored in the decoded picture buffer 1150. In some embodiments, the decoded picture buffer 1150 is a storage external to the video decoder 1100. In some embodiments, the decoded picture buffer 1150 is a storage internal to the video decoder 1100.

The intra-prediction module 1125 receives intra-prediction data from bitstream 1195 and according to which, produces the predicted pixel data 1113 from the decoded pixel data 1117 stored in the decoded picture buffer 1150. In some embodiments, the decoded pixel data 1117 is also stored in a line buffer (not illustrated) for intra-picture prediction and spatial MV prediction.

In some embodiments, the content of the decoded picture buffer 1150 is used for display. A display device 1155 either retrieves the content of the decoded picture buffer 1150 for display directly, or retrieves the content of the decoded picture buffer to a display buffer. In some embodiments, the display device receives pixel values from the decoded picture buffer 1150 through a pixel transport.

The motion compensation module 1130 produces predicted pixel data 1113 from the decoded pixel data 1117 stored in the decoded picture buffer 1150 according to motion compensation MVs (MC MVs). These motion compensation MVs are decoded by adding the residual motion data received from the bitstream 1195 with predicted MVs received from the MV prediction module 1175.

The MV prediction module 1175 generates the predicted MVs based on reference MVs that were generated for decoding previous video frames, e.g., the motion compensation MVs that were used to perform motion compensation. The MV prediction module 1175 retrieves the reference MVs of previous video frames from the MV buffer 1165. The video decoder 1100 stores the motion compensation MVs generated for decoding the current video frame in the MV buffer 1165 as reference MVs for producing predicted MVs.

The in-loop filter 1145 performs filtering or smoothing operations on the decoded pixel data 1117 to reduce the artifacts of coding, particularly at boundaries of pixel blocks. In some embodiments, the filtering or smoothing operations performed by the in-loop filter 1145 include deblock filter (DBF), sample adaptive offset (SAO), and/or adaptive loop filter (ALF).

Figure 12:
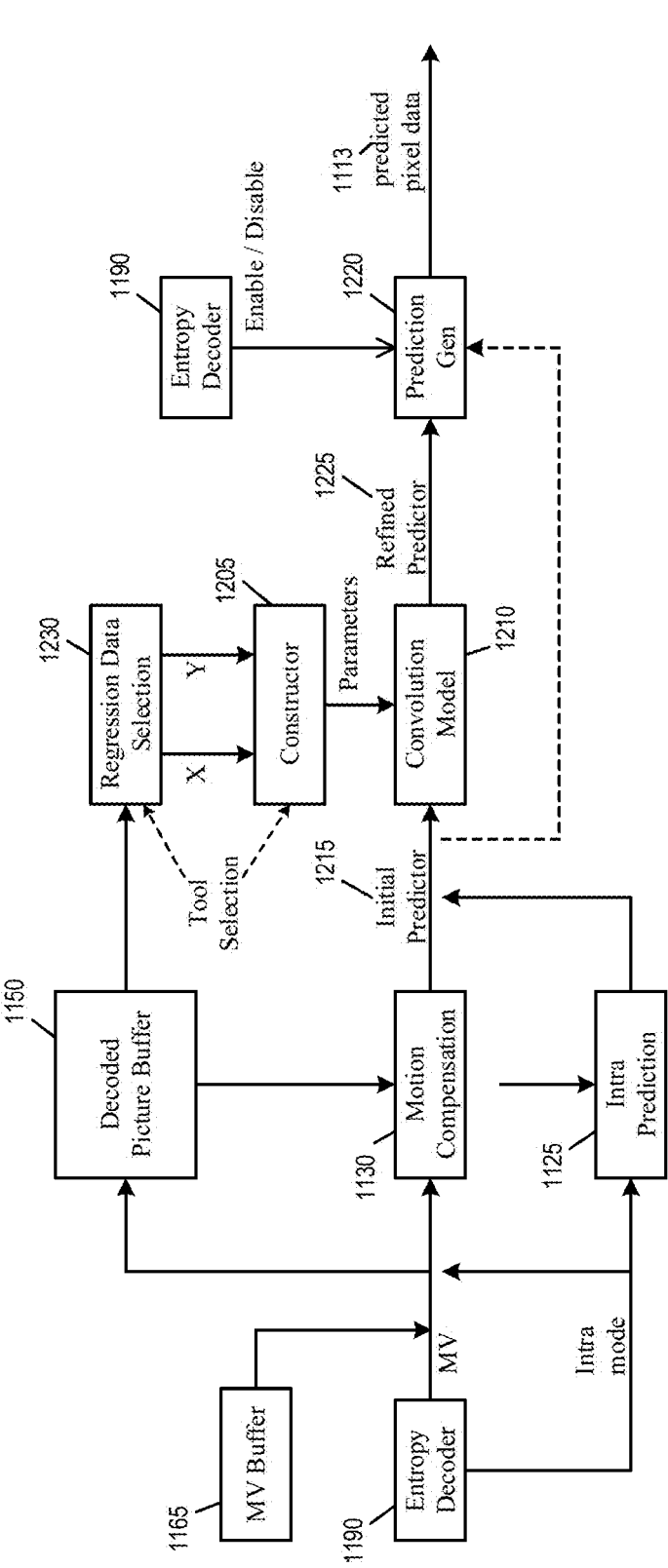
FIG. 12 illustrates portions of the video decoder that implement a unified cross-component convolution model.

FIG. 12 illustrates portions of the video decoder 1100 that implement a unified cross-component convolution model. When the current block is coded by inter-prediction, the entropy decoder module 1190 or the MV buffer 865 may provide a MV that is used by the motion compensation module 1130 to identify a reference block in a reference picture. When the current block is coded by intra-prediction, the entropy decoder module 1190 provide an intra mode or BV that is used by the intra-prediction module 1125 to identify a reference block in the current picture. In some embodiments, the reference block is used as an initial predictor of the current block. The initial predictor may include component samples (luma or chroma) of the reference block for predicting the component samples of the current block, or component samples of the current block for cross-component prediction.

To derive a convolution model 1210, a regression data selection module 1230 retrieves component samples of pixels in and/or around the current block and in and/or around the reference block from the reconstructed picture buffer 1150 to serve as regression data, which may include reference samples (X) and current samples (Y). The regression data selection module 1230 selects among different sets of samples (e.g., different reference lines or different groups of samples) as reference/current samples based on which coding tool is selected for the current block.

A model constructor 1205 uses the regression data to derive the parameters of the convolution model 1210 using techniques such as elimination method, iteration method, or decomposition method. The convolution model 1210 is a higher-degree model having multiple filter taps that can be configured to support different coding tools by e.g., setting certain terms or filter taps to zero based on which coding tool is selected for the current block. The derivation of the convolution model 1205 for different coding tools is described by reference to FIG. 6 above.

The convolution model 1210 is applied to the initial predictor 1215 to generate a refined predictor 1225. The samples of the refined predictor 1225 may be used as the predicted pixel data 1113. In some embodiments, the entropy decoder 1190 may receive a syntax element for expressly enabling or disabling the refinement of intra- or inter-prediction by the convolution model 1210, so that the samples of the initial predictor can be used as the predicted pixel data 1113. In some embodiments, a prediction generator 1220 may combine (e.g., as a weighted sum) the initial predictor 1215 and the refined predictor 1225 as the predicted pixel data 1113.

FIG. 13 conceptually illustrates a process 1300 for deriving and using a unified convolution model that is configurable for different coding tools. In some embodiments, one or more processing units (e.g., a processor) of a computing device implementing the decoder 1100 performs the process 1300 by executing instructions stored in a computer readable medium. In some embodiments, an electronic apparatus implementing the decoder 1100 performs the process 1300.

The decoder receives (at block 1310) data to be decoded as a current block of pixels in a current picture of a video. The decoder receives (at block 1320) a selection of a coding tool among a plurality of coding tools.

The decoder specifies (at block 1330) a set of regression data based on the selection of the coding tool. The specified set of regression data is selected from component samples within or neighboring a reference block or the current block. In some embodiments, the set of regression data is selected from a plurality of reference lines neighboring the current block, and the regression data of different coding tools are selected from different reference lines. In some embodiments, the set of regression data is selected from reference samples that are classified into multiple groups of reference samples, and the regression data of different coding tools are selected from different groups of reference samples. In some embodiments, when the set of regression data includes invalid samples that fall outside of a restricted boundary (e.g., slice boundary, sub-picture boundary, or CTU boundary), the decoder performs an action based on the selection of the coding tool (e.g., setting the invalid samples to NULL, 0, or a predefined inactive value.)

The decoder specifies (at block 1340) a configuration of a convolution model according to the selection of the coding tool. The convolution model is configurable to support each of the plurality of coding tools. In some embodiments, the convolution model is a higher-degree model having a filter with more than two filter taps. In some embodiments, the convolution model comprises a plurality of terms, and the decoder configures the convolution model by setting one or more of the terms to zero. The convolution model may have multiple taps that correspond to component samples that surround a center component sample. The center sample may be a luma sample that is collocated with a chroma sample to be predicted. The convolution model may include a (plus sign shape) multi-tap spatial component, a non-linear term, and a bias term, and inputs to the spatial 5-tap component includes a center (C) component sample and its north (N), south (S), west (W) and east (E) neighboring component samples.

The decoder derives (at block 1350) parameters of the convolution model by applying the set of regression data according to the specified configuration. In some embodiments, the parameters of the convolution model are derived by finding an optimal vector of a higher-degree model by using e.g., an elimination-based method, a decomposition-based method, or an iteration-based method.

The decoder applies (at block 1360) the convolution model with the generated parameters to a set of reference component samples to obtain a set of predictor component samples. The decoder reconstructs (at block 1370) the current block by using the predictor component samples.

The decoder may then provide the reconstructed current block for display as part of the reconstructed current picture.

VIII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 14:
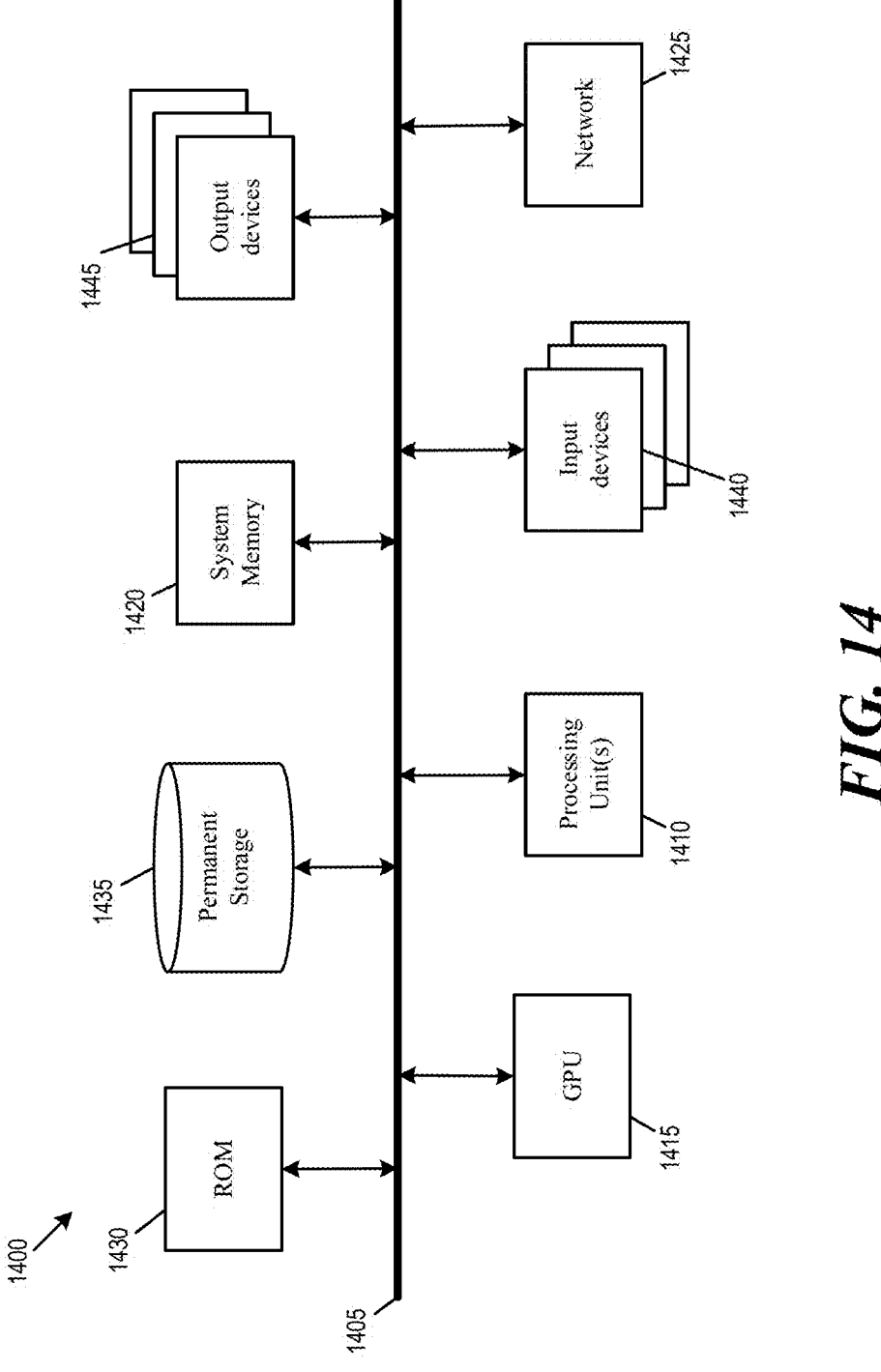
FIG. 14 conceptually illustrates an electronic system with which some embodiments of the present disclosure are implemented.

FIG. 14 conceptually illustrates an electronic system 1400 with which some embodiments of the present disclosure are implemented. The electronic system 1400 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1400 includes a bus 1405, processing unit(s) 1410, a graphics-processing unit (GPU) 1415, a system memory 1420, a network 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the GPU 1415, the read-only memory 1430, the system memory 1420, and the permanent storage device 1435.

From these various memory units, the processing unit(s) 1410 retrieves instructions to execute and data to process in order to execute the processes of the present disclosure. The processing unit(s) may be a single processor or a multi-core processor in different embodiments. Some instructions are passed to and executed by the GPU 1415. The GPU 1415 can offload various computations or complement the image processing provided by the processing unit(s) 1410.

The read-only-memory (ROM) 1430 stores static data and instructions that are used by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the present disclosure use a mass-storage device (such as a magnetic or optical disk and its corresponding disk drive) as the permanent storage device 1435.

Other embodiments use a removable storage device (such as a floppy disk, flash memory device, etc., and its corresponding disk drive) as the permanent storage device. Like the permanent storage device 1435, the system memory 1420 is a read-and-write memory device. However, unlike storage device 1435, the system memory 1420 is a volatile read-and-write memory, such a random access memory. The system memory 1420 stores some of the instructions and data that the processor uses at runtime. In some embodiments, processes in accordance with the present disclosure are stored in the system memory 1420, the permanent storage device 1435, and/or the read-only memory 1430. For example, the various memory units include instructions for processing multimedia clips in accordance with some embodiments. From these various memory units, the processing unit(s) 1410 retrieves instructions to execute and data to process in order to execute the processes of some embodiments.

The bus 1405 also connects to the input and output devices 1440 and 1445. The input devices 1440 enable the user to communicate information and select commands to the electronic system. The input devices 1440 include alpha-numeric keyboards and pointing devices (also called "cursor control devices"), cameras (e.g., webcams), microphones or similar devices for receiving voice commands, etc. The output devices 1445 display images generated by the electronic system or otherwise output data. The output devices 1445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 10 and FIG. 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:

receiving data for a block of pixels to be encoded or decoded as a current block of a current picture of a video;

receiving a selection of a coding tool among a plurality of coding tools;

specifying a set of regression data based on the selection of the coding tool, wherein the specified set of regression data is selected from component samples within or neighboring a reference block or the current block;

specifying a configuration of a convolution model according to the selection of the coding tool, wherein the convolution model is configurable to support each of the plurality of coding tools;

deriving parameters of the convolution model by applying the set of regression data according to the specified configuration;

applying the convolution model with the generated parameters to a set of reference component samples to obtain a set of predictor component samples; and encoding or decoding the current block by using the predictor component samples.

2. The video coding method of claim 1, wherein the convolution model is a higher-degree model comprising a filter with more than two filter taps.

3. The video coding method of claim 2, wherein the parameters of the convolution model are obtained by using a unified solver that is used to solve a matrix equation for the plurality of coding tools, wherein the matrix equation is represented by Ax=b, A is an auto-correlation matrix, b is a cross-correlation vector, and x is the parameters to be solved.

4. The video coding method of claim 3, wherein the unified solver uses an elimination-based method to determine an optimal vector of the convolution model as a solution for the parameters of the convolution model.

5. The video coding method of claim 3, wherein the unified solver uses a decomposition-based method to determine an optimal vector of the convolution model as a solution for the parameters of the convolution model.

6. The video coding method of claim 3, wherein the unified solver uses an iteration-based method to determine an optimal vector of the convolution model as a solution for the parameters of the convolution model.

7. The video coding method of claim 3, wherein the set of regression data is selected from a unified range of a plurality of reference lines neighboring the current block, the unified range being common to the plurality of coding tools.

8. The video coding method of claim 7, wherein regression data of different coding tools are selected from a same number of reference lines in the unified range.

9. The video coding method of claim 7, wherein the unified range of the plurality of reference lines is stored in a line buffer used by the plurality of coding tools.

10. The video coding method of claim 7, wherein the set of regression data is selected from reference samples that are classified into a plurality of groups of reference samples, wherein regression data of different coding tools are selected from different groups of reference samples.

11. The video coding method of claim 7, further comprising performing a unified action that is common to the plurality of coding tools when the set of regression data comprises invalid samples.

12. The video coding method of claim 11, wherein an invalid sample is a sample that fall outside of a restricted boundary or is forbidden by at least one of the plurality of coding tools.

13. An electronic apparatus comprising:

a video coder circuit configured to perform operations comprising:

receiving data for a block of pixels to be encoded or decoded as a current block of a current picture of a video;

receiving a selection of a coding tool among a plurality of coding tools;

specifying a set of regression data based on the selection of the coding tool, wherein the specified set of regression data is selected from component samples within or neighboring a reference block or the current block;

specifying a configuration of a convolution model according to the selection of the coding tool, wherein the convolution model is configurable to support each of the plurality of coding tools;

deriving parameters of the convolution model by applying the set of regression data according to the specified configuration;

applying the convolution model with the generated parameters to a set of reference component samples to obtain a set of predictor component samples; and encoding or decoding the current block by using the predictor component samples.

14. A video decoding method comprising:

receiving data for a block of pixels to be decoded as a current block of a current picture of a video;

receiving a selection of a coding tool among a plurality of coding tools;

specifying a set of regression data based on the selection of the coding tool, wherein the specified set of regression data is selected from component samples within or neighboring a reference block or the current block;

specifying a configuration of a convolution model according to the selection of the coding tool, wherein the convolution model is configurable to support each of the plurality of coding tools;

deriving parameters of the convolution model by applying the set of regression data according to the specified configuration;

applying the convolution model with the generated parameters to a set of reference component samples to obtain a set of predictor component samples; and reconstructing the current block by using the predictor component samples.

* * * * *